(12) United States Patent
Shekhar et al.

(10) Patent No.: US 9,285,218 B2
(45) Date of Patent: Mar. 15, 2016

(54) SHORTEST TRAVEL PATH DETERMINATION USING CRITICAL START TIME POINTS

(71) Applicant: Regents of the University of Minnesota, Minneapolis, MN (US)

(72) Inventors: Shashi Shekhar, Plymouth, MN (US); Venkata Maruti Viswanath Gunturi, Minneapolis, MN (US); KwangSoo Yang, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 210 days.

(21) Appl. No.: 13/974,777

(22) Filed: Aug. 23, 2013

(65) Prior Publication Data

US 2014/0058674 A1  Feb. 27, 2014

(51) Int. Cl.
*G01C 21/00* (2006.01)
*G01C 21/34* (2006.01)
*G06Q 10/04* (2012.01)

(52) U.S. Cl.
CPC ............ *G01C 21/00* (2013.01); *G01C 21/3446* (2013.01); *G06Q 10/047* (2013.01)

(58) Field of Classification Search
CPC .. G01C 21/34; G01C 21/343; G01C 21/3446; G01C 21/3453; G01C 21/3492
USPC ......... 701/410, 411, 416, 418, 420, 421, 425, 701/465, 467, 533
See application file for complete search history.

(56) References Cited

U.S. PATENT DOCUMENTS

| | | | | |
|---|---|---|---|---|
| 7,003,398 B2 * | 2/2006 | Seligmann | ............. | G08G 1/123 340/994 |
| 8,566,030 B1 * | 10/2013 | Demiryurek | ....... | G01C 21/3492 701/409 |
| 2007/0038362 A1 * | 2/2007 | Gueziec | ............. | G01C 21/3492 701/117 |
| 2008/0004794 A1 * | 1/2008 | Horvitz | .............. | G01C 21/3492 701/414 |
| 2009/0037100 A1 * | 2/2009 | Fujiwara | ............ | G01C 21/3492 701/533 |
| 2011/0178702 A1 * | 7/2011 | Lassesson | .............. | G01C 21/34 701/408 |
| 2011/0301841 A1 * | 12/2011 | Schuurbiers | ....... | G01C 21/3492 701/465 |
| 2012/0158301 A1 * | 6/2012 | Schilling | ................. | H03M 7/40 701/533 |
| 2012/0283948 A1 * | 11/2012 | Demiryurek | ....... | G01C 21/3492 701/533 |
| 2013/0166204 A1 * | 6/2013 | Davies | ................... | G01C 21/34 701/533 |
| 2013/0204525 A1 * | 8/2013 | Pfeifle | ................ | G08G 1/09626 701/533 |
| 2013/0204527 A1 * | 8/2013 | Schilling | ................ | G01C 21/34 701/533 |

OTHER PUBLICATIONS

George et al., Spatio-temporal Network Databases and Routing Algorithms: A summary of results, 2007, University of Minnesota.*

(Continued)

*Primary Examiner* — Thomas G Black
*Assistant Examiner* — Sara Lewandroski
(74) *Attorney, Agent, or Firm* — Westman, Champlin & Koehler, P.A.; Theodore M. Magee

(57) ABSTRACT

A shortest path from a source to a destination for a current start time in a set of start times is determined. A processor identifies a critical start time in the set of start times that is temporally separated from the current start time by at least one intermediate start time. The shortest path from the source to the destination for the current start time is set as the shortest path for the at least one intermediate start time without separately determining the shortest path for the at least one intermediate start time. A different shortest path is determined from the source to the destination for the critical start time.

17 Claims, 15 Drawing Sheets

(56) References Cited

OTHER PUBLICATIONS

Ding et al., Finding Time-Dependent Shortest Paths over Large Graphs, 2008, EDBT.*
Zhang et al., Hierarchical model for routing query in spatio-temporal networks, 2010, University of Minnesota.*
Booth et al., A data model for trip planning in multimodal transportation systems, In proceedings of the 12th International Conference on Extending Database Technology: Advances in Database Technology, pp. 994-1005, ACM, 2009.
Chabini et al., Adaptations of the A* algorithm for computation of fastest paths in deterministic discrete-time dynamic networks, IEEE Transaction on Intelligent Transportation Systems, vol. 3, No. 1, pp. 60-74, 2002.
Delta airlines, http://www.delta.com/.
Demiryurek et al., A case for time-dependent shortest path computation in spatial networks, In: Proc. of the SIGSPATIAL Intl. Conf. on Advances in GIS, pp. 474-477, GIS 2010.
Demiryurek et al., Online computation of the fastest path in time-dependent spatial networks, In Proceedings of the 12th international conference on Advances in spatial and temporal databases (SSTD'11), Springer-Verlang, Berlin, Heidelberg, pp. 92-111, 2011.
Deutsch U.P.S. Embraces High-Tech Delivery methods, NY Times, Jul. 12, 2007, www.nytimes.com/2007/07/12/business/12ups.html.
Ding et al., Finding time-dependent shortest paths over large graphs, In: Proc. of the Intl. Conf. on Extending Database Technology (EDBT), pp. 205-216, 2008.
Foschini et al., On the complexity of time-dependent shortest paths; In: SODA, pp. 327-341, 2011.
Google maps, http://www.maps.google.com/.
Gunturi et al., Minimum spanning tree on spatio-temporal networks, In: Proc. of the 21st Intl. Conf. on Database and expert systems applications: Part II, pp. 149-158, DEXA, 2010.
Hoel et al., High performance multimodal networks, in SSTD, pp. 308-327, 2005.
Kanoulas et al, Finding fastest paths on a road network with speed patterns, In: Proceedings of the 22nd International Conference on Data Engineering (ICDE), 10 pages, 2006.
Lovell, Left-hand-turn elimination, NY Times, Dec. 9, 2007, http://www.nytimes.com/2007/12/09/magazine/09left-handturn.html, 2 pages.
Navteq, http://www.navteq.com/.
Potamias et al., Fast shortest path distance estimation in large networks, In proceedings of the 18th ACM conference on Information and knowledge management, CIKM 2009, pp. 867-876.
Samet et al., Scalable network distance browsing in spatial databases, In Proceedings of the 2008 ACM SIGMOD international conference on Management of data, SIGMOD 2008, pp. 43-54.
Sanders et al., Engineering fast route planning algorithms, In Proceedings of the 6th international conference on Experimental algorithms, pp. 23-36, Springer-Verlag, 2007.
Yuan et al., T-drive: driving directions based on taxi trajectories, In: Proceedings of the SIGSPATIAL international conference on Advances in GIS, pp. 99-108, GIS 2010.
E.P. Chan and H. Lim. Optimization and evaluation of shortest path queries. The VLDB Journal the International Journal on Very Large Data Bases, 16(3):343--369, 2007. Springer-Verlag New York, Inc.
Delling, D.: Time-dependent SHARC-routing. In: Halperin, D., Mehlhorn, K. (eds.) Esa 2008. LNCS, vol. 5193, pp. 332-343. Springer, Heidelberg (2008).
Evans, M.R., Yang, K., Kang, J.M., Shekhar, S.: A lagrangian approach for storage of spatio-temporal network datasets: a summary of results. In: Proc. of the SIGSPATIAL Intl. Conf. on Advances in GIS. pp. 212-221. GIS '10 (2010).
George, B., Shekhar, S.: Time-aggregated graphs for modelling spatio-temporal networks. J. Semantics of Data XI, 191 (2007).
George, B., Shekhar, S., Kim, S.: Spatio-temporal network databases and routing algorithms. Tech. Rep. 08-039, Univ. of Minnesota—Comp. Sci. and Engg. (2008).
George, B., Kim, S., Shekhar, S.: Spatio-temporal network databases and routing algorithms: A summary of results. In: Papadias, D., Zhang, D., Kollios, G. (eds.) SSTD 2007. LNCS, vol. 4605, pp. 460-477. Springer, Heidelberg (2007).
G.R. Jagadeesh, T. Srikanthan, and K.H. Quek. Heuristic techniques for accelerating hierarchical routing on road networks. IEEE Transactions on Intelligent Transportation Systems, 3(4):301--309, 2002.
Ning Jing, Yun-Wu Huang, and Elke A. Rundensteiner. Hierarchical optimization of optimal path finding for transportation applications. In Proceedings of the fifth international conference on Information and knowledge management (CIKM), pp. 261-268, 1996. ACM.
Kaufman, D.E., Smith, R.L.: Fastest paths in time-dependent networks for intelligent vehicle-highway systems application. I V H S Journal 1(1), 1-11 (1993).
Kohler, E., Langkau, K, Skutella, M.: Time-expanded graphs for flow-dependent transit times. In: Algorithms ESA 2002, vol. 2461, pp. 49-56 (2002).
Kohler, E., Langkau, K, Skutella, M.: Time-expanded graphs for flow-dependent transit times. In: Mohring, R.H., Raman, R. (eds.) ESA 2002. LNCS, vol. 2461, pp. 599-611. Springer, Heidelberg (2002).
M. Mabrouk, T. Bychowski, H. Niedzwiadek, Y. Bishr, JF Gaillet, N. Crisp, W. Wilbrink, M. Horhammer, G. Roy, and S. Margoulis. Opengis location services (openls): Core services. OGC Implementation Specification, 5:016, 2005. Citeseer.
Nannicini, G., Delling, D., Liberti, L., Schultes, D.: Bidirectional A* search for time dependent fast paths. In: McGeoch, C.C. (ed.) WEA 2008. LNCS, vol. 5038, pp. 334-346. Springer, Heidelberg (2008).
Orda, A., Rom, R.: Shortest-path and minimum-delay algorithms in networks with time-dependent edge-length. J. ACM 37(3), 607-625 (Jul. 1990).
S. Shekhar, A. Fetterer, and B. Goyal. Materialization trade-offs in hierarchical shortest path algorithms. In Advances in Spatial Databases, pp. 94-111. Springer, 1997.
S. Shekhar, Ashim Kohli, and Mark Coyle. Path computation algorithms for advanced traveller information system (atis). In Proceedings of the Ninth International Conference on Data Engineering, Apr. 19-23, 1993, Vienna, Austria, pp. 31-39. IEEE Computer Society, 1993.

* cited by examiner

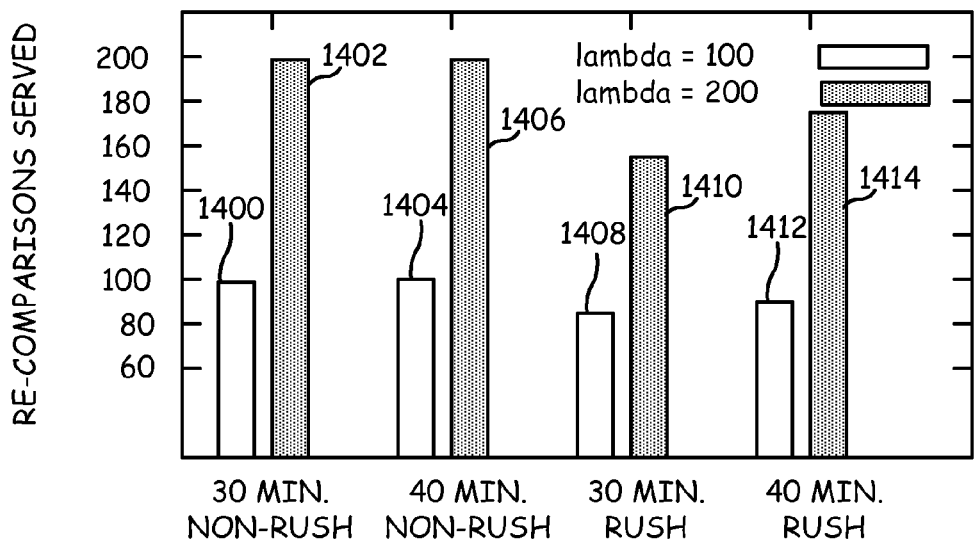
FIG. 14
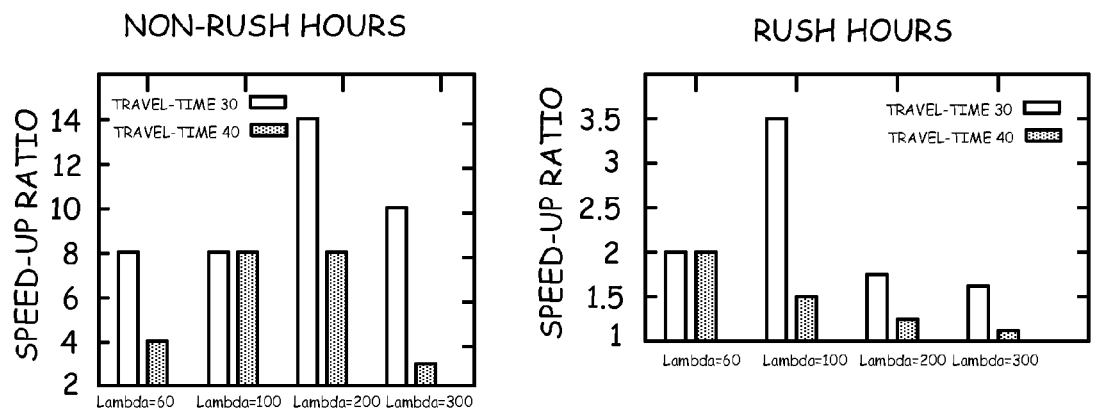
FIG. 15a
FIG. 15b

SHORTEST TRAVEL PATH DETERMINATION USING CRITICAL START TIME POINTS

This invention was made with government support under IIS-0713214 awarded by the National Science Foundation (NSF) and under HM 1582-08-1-0017 awarded by the United States Department of Defense (USDOD) (Nat'l Geospatial Intelligence Agency). The government has certain rights in the invention.

BACKGROUND

Determining the shortest route between a source and a destination is a common problem in shipping and travel. When the shortest route is measure by the time it takes to go from the source to the destination, current conditions along each of the routes can be examined to identify which route is the shortest.

The shortest path from a source to a destination is separately determined for fewer than all of a plurality of possible start times. For each start time that a shortest path is not separately determined, a shortest path from the source to the destination that was separately determined for a preceding start time is assigned to the start time.

A memory contains a list of possible start times for traveling from a source to a destination across a network of edges. A processor selects an earliest start time from the list of possible start times and determines path functions for paths in the network to identify a shortest path from the source to the destination for the earliest start time. The processor uses the path functions to generate a second list of start times, the second list of start times containing start times when the shortest path will change. The processor performs an iteration to identify a shortest path from the source to the destination for each start time in the second list of start times. The processor sets the shortest path for start times in the list of possible start times that are not in the second list of start times without performing the iteration.

The discussion above is merely provided for general background information and is not intended to be used as an aid in determining the scope of the claimed subject matter. The claimed subject matter is not limited to implementations that solve any or all disadvantages noted in the background.

SUMMARY

A shortest path from a source to a destination for a current start time in a set of start times is determined. A processor identifies a critical start time in the set of start times that is temporally separated from the current start time by at least one intermediate start time. The shortest path from the source to the destination for the current start time is set as the shortest path for the at least one intermediate start time without separately determining the shortest path for the at least one intermediate start time. A different shortest path is determined from the source to the destination for the critical start time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 14 is a graph of the number of recomputations saved under some embodiments.

FIGS. 15a and 15b are graphs of the effect of Lambda on speed-up for non-rush hour and rush hour start times.

DETAILED DESCRIPTION

Innovations described below involve the recognition that the shortest route (in terms of time) between a source and a destination changes depending on when the trip between the source and the destination starts. For example, one route may be faster during rush hour while another route may be faster outside of rush hour. A major challenge to determining such shortest routes is that the computation for finding a single shortest route is time consuming. If redundant computations are not avoided, a typical problem having 1000 potential start times and a map with one billion nodes/edges would require computing one trillion path scores and it would take far too long to return a result to a user. Another challenge to determining the shortest route when the shortest route can change depending on the start time is that the shortest routes may not exhibit first-in-first-out (FIFO) behavior. In other words, a person who starts their trip later may arrive earlier because the shortest route for their later start time may be significantly shorter than the shortest route at the earlier start time.

The innovations described below take into account this non-FIFO behavior and reduce the number of computations needed by identifying critical time points when the shortest route is expected to change. For each of the critical time points, a search for the shortest route is conducted. For all other starting times, the shortest route is assumed to be the same as the shortest route found for the preceding critical time. For example, if the shortest routes are to be found for every ten minute interval from 7:30-11:00 am, and the innovation determines that there is a critical time point at 9:30 am, a search for the shortest route will be performed for a starting time of 7:30 and a starting time of 9:30. The shortest route determined for 7:30 will then be designated as the shortest route for all starting times in the interval 7:30-9:30 without separately searching for those shortest routes. Similarly, the shortest route determined for the critical time point of 9:30 will be designated as the shortest route for all starting times in the interval 9:30-11:00 without separately searching for those shortest routes.

Figure 1:
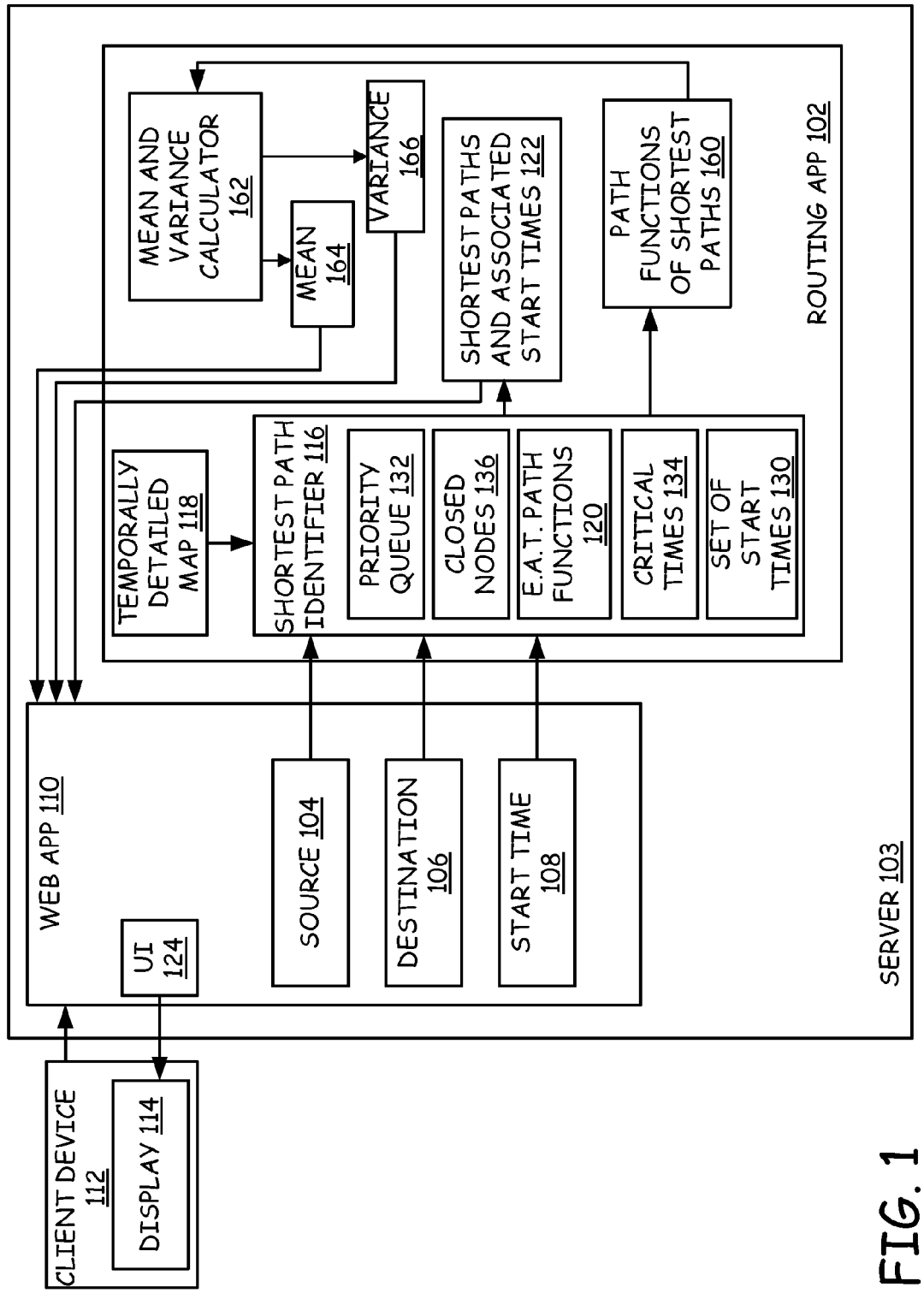
FIG. 1 is a block diagram of a system used to return a collection of shortest routes or paths.
Figure 2:
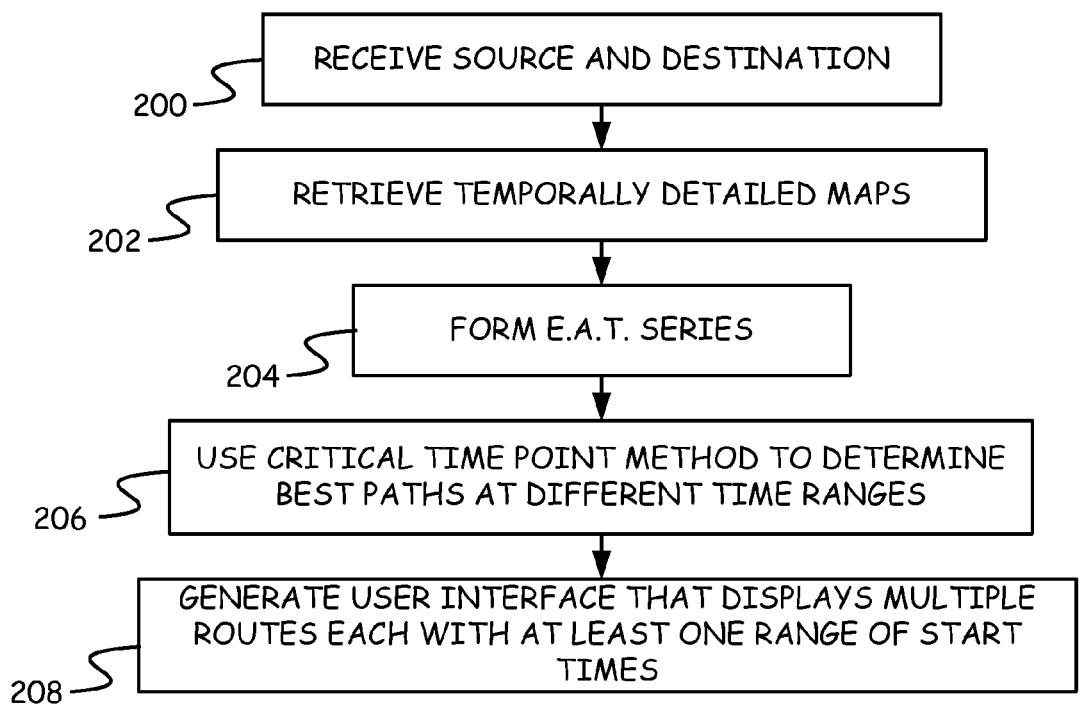
FIG. 2 is a flow diagram of a method of determining a collection of shortest routes.

FIG. 1 provides a block diagram of a system used to return a collection of shortest routes or paths together with starting times during which those shortest routes are valid. FIG. 2 provides a flow diagram of a method of determining such a collection of shortest routes.

In step 200, a routing application 102 on a server 103 receives a source 104 and a destination 106. In the embodiment shown in FIG. 1, routing application 102 receives the source 104 and the destination 104 from a web application 110, which in turn receives the source and destination from a client device 112 on which a user interface 124 is displayed on a display 114. For example, the source and destination can be entered in client device 112 as a query for a route. Although FIG. 1 depicts the client device 112 interacting with web application 110 on server 103, in alternative embodiments, routing application 102 may be embedded directly within client device 112 and may generate user interface 124 directly without the use of web application 110.

At step 202, a shortest path identifier 116 in routing application 102 retrieves temporally detailed maps 118. Temporally detailed maps 118 contain nodes that include the source and the destination, a network of edges or segments between the nodes and transit times for travelling across each edge at different times for each day of the week. In maps 118, the length of time needed to travel along an edge, such as a road or a flight, can change depending on the time of day when the trip begins.

At step 204, shortest path identifier 116 generates earliest arrival time (E.A.T.) path functions 120 for each segment in temporally detailed maps 118 that is relevant to determining a shortest path between source 104 and destination 106.

Figure 3:
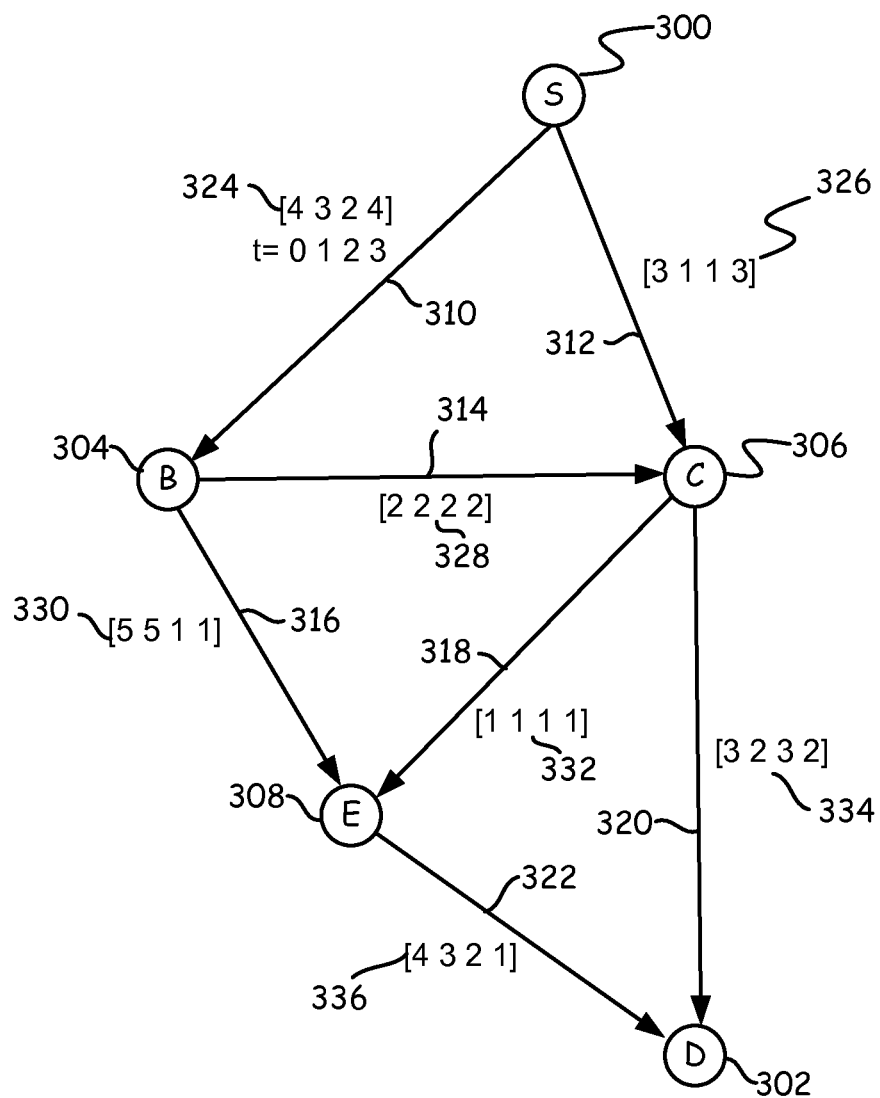
FIG. 3 is a rendering of information provided by a temporally detailed map.

FIG. 3 provides a rendering of the information provided by temporally detailed map 118. In FIG. 3, the source is shown as node 300 and the destination is shown as node 302. In addition, three intermediate nodes 304, 306 and 308 are provided. Each node represents an intersection between at least two segments such as a road segment or a flight segment. In FIG. 3, segments 310, 312, 314, 316, 318, 320, and 322 are provided. Each of the segments is alternatively referred to as an edge. In temporally detailed maps 118, each edge has an associated travel time series such as travel time series 324, 326, 328, 330, 332, 334, and 336. Each time series provides a separate transit time for a separate start time t. For example, the travel time series 324 has a travel time of 4 at start time t=0, 3 at start time t=1, 2 at start time t=2, and 4 at start time t=3.

Figure 4:
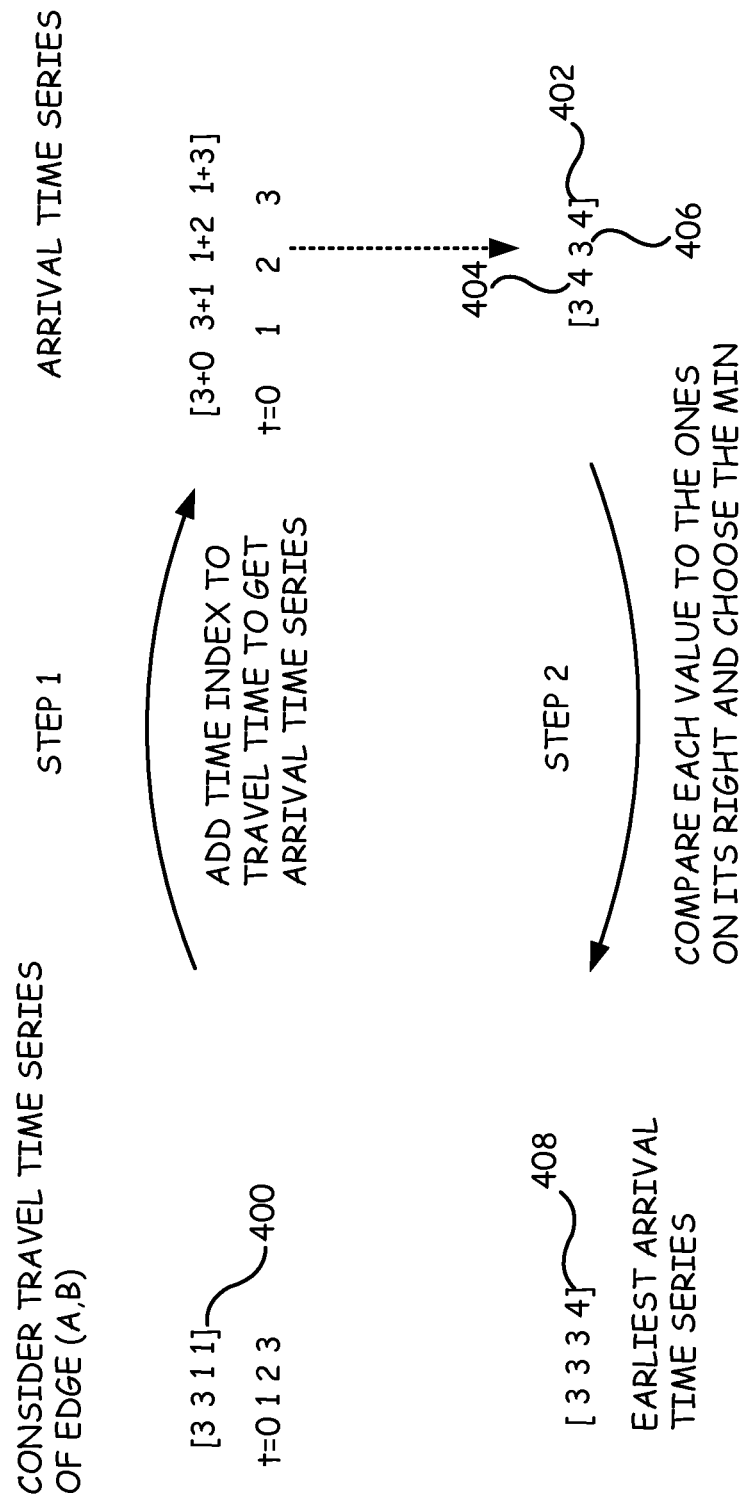
FIG. 4 shows a conversion from travel time to earliest arrival time.

Computing an earliest arrival time path function involves converting the travel time series of each edge or path into the earliest time that a traveler can arrive at the end of the path at each start time. To do this, the process shown in FIG. 4 is followed. In FIG. 4, the initial travel series 400 is first altered to add the time index of the starting time to the travel time to form an arrival time series 402 that indicates the time at which a traveler moving along the path would arrive at the end of the path. Next, each of the arrival times is compared to the arrival times to its right and if any of the arrival times to its right are earlier, the arrival time is replaced by the earlier arrival time. For example, in arrival time series 402, arrival time 404 would be compared to arrival time 406. Since arrival time 406 is earlier than arrival time 404, arrival time 404 is replaced with the value of arrival time 406 to produce an earliest arrival time series 408. Note that in earliest arrival time 408, arrival time 404 has been replaced with the value of arrival time 406. The step of replacing an arrival time with an earlier arrival time to its right is based on the recognition that if there is an earlier arrival time to the right of a given arrival time, it means that the path is exhibiting non-FIFO behavior in that a traveler starting at a later time arrives at the end of the path at an earlier time. For example, in the arrival times 402, a traveler leaving at time t=2 arrives at the end of the path at time t=3 whereas a traveler leaving at time t=1 arrives at the end of the path at time t=4. If a traveler who is scheduled to leave at time t=1 waits to leave until time t=2, they can arrive earlier at the end of the path. Thus, earliest arrival time series 408 represents the earliest a traveler can reach the end of a path if they start at the beginning of the path on or after a selected time point.

At step 206, shortest path identifier 116 uses the earliest arrival time path functions 120 in a critical time point method to identify shortest paths and their associated start times 122. Details of how shortest path identifier 116 identifies the shortest paths are described below in connection with FIG. 5. Once the shortest paths and their associated start times 122 have been generated, they are returned to web application 110, which generates a user interface 124 at step 208. User interface 124 is displayed on display 114 of client device 112 and in accordance with one embodiment shows multiple routes each with at least one range of start times during which the route is the shortest route between the source and the destination. Examples of such user interfaces are discussed further below.

Figure 5:
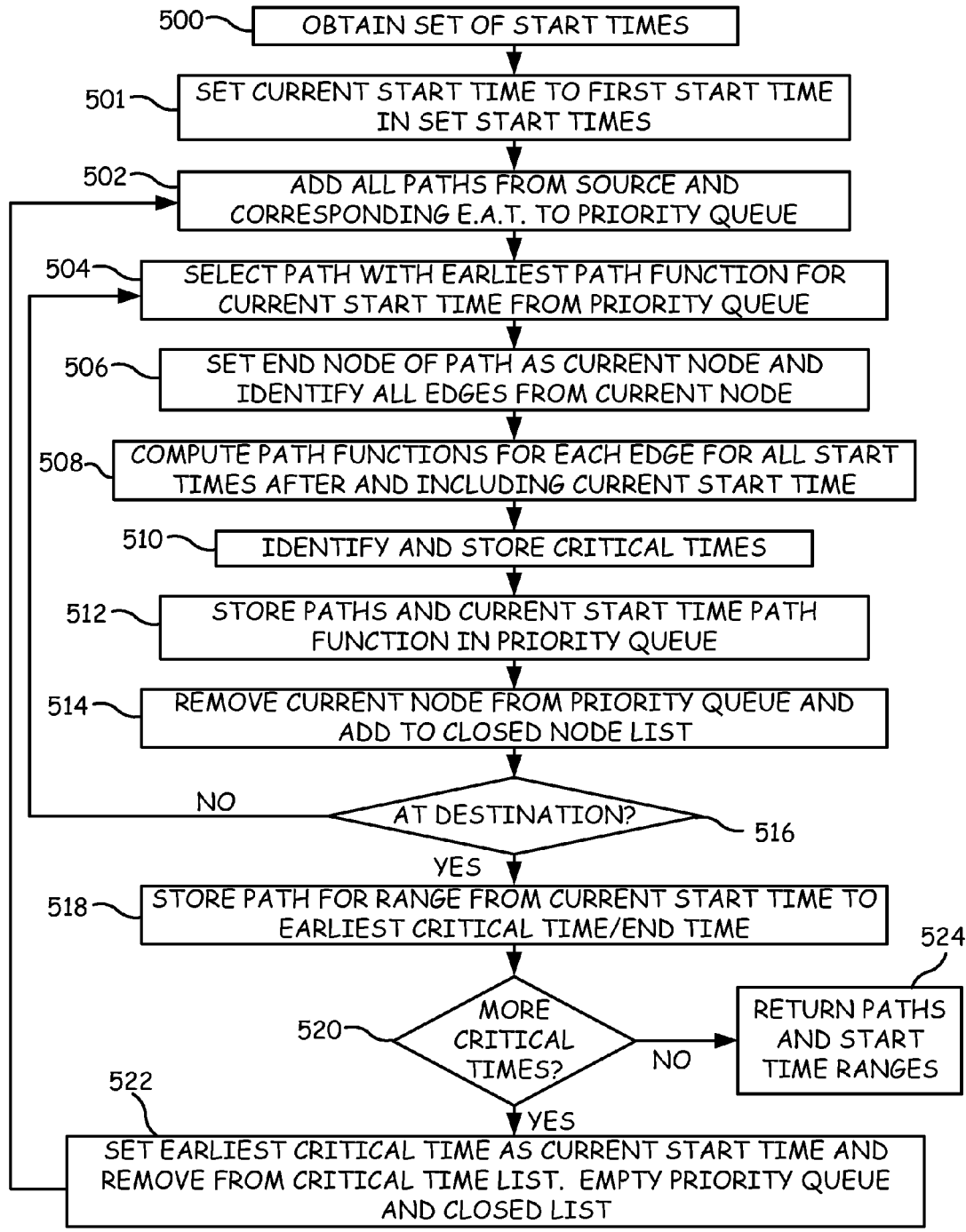
FIG. 5 shows a method of determining shortest routes.

FIG. 5 provides a flow diagram of a method of determining shortest routes for ranges of start times by identifying critical times at which the shortest route changes and thereby reducing the amount of redundant calculations that must be performed. In the method of FIG. 5, the critical times are identified while identifying the shortest routes such that all of the possible routes do not have to be identified before the critical times are identified.

At step 500 of FIG. 5, a set of start times 130 is obtained. The set of start times 130 can be based on a range of start times provided by client device 112. Alternatively, shortest path identifier 116 assumes that the range of start times begins from the current time and ends 24 hours from the current time. Thus, if it is 2:00 p.m. when shortest path identifier 116 is requested to provide shortest routes, shortest path identifier 116 will use 2:00 p.m. as the beginning time of the time range and 1:59 p.m. the next day as the ending time of the time range. In accordance with one embodiment, shortest path identifier 116 converts the time range into a set of start times 130 by dividing the time range into evenly distributed start times that are each separated by a same interval. At step 501, the first start time in the set of start times 130 is set as a current start time. If only a single start time is provided by the user, the set of start times will only include a single start time.

At step 502, shortest path identifier 116 adds paths and corresponding expected arrival times to a priority queue 132. Specifically, shortest path identifier 116 adds all paths leading away from the source in temporally detailed maps 118 and the corresponding expected arrival times for those paths. The corresponding earliest arrival times for each path include an earliest arrival time for each possible start time where an earliest arrival time is the earliest time at which a traveler will reach the next node along the path. Within the priority queue, the earliest arrival times are treated as path functions, which are described further below.

At step 504, the path in the priority queue with the earliest arrival time (lowest path function) for the current start time is selected. At step 506, the node at the end of the selected path is set as a current node and all edges that extend from the current node are identified from the temporally detailed maps 118. At step 508, path functions for each of these edges are computed for all start times after and including the current start time.

Figure 6:
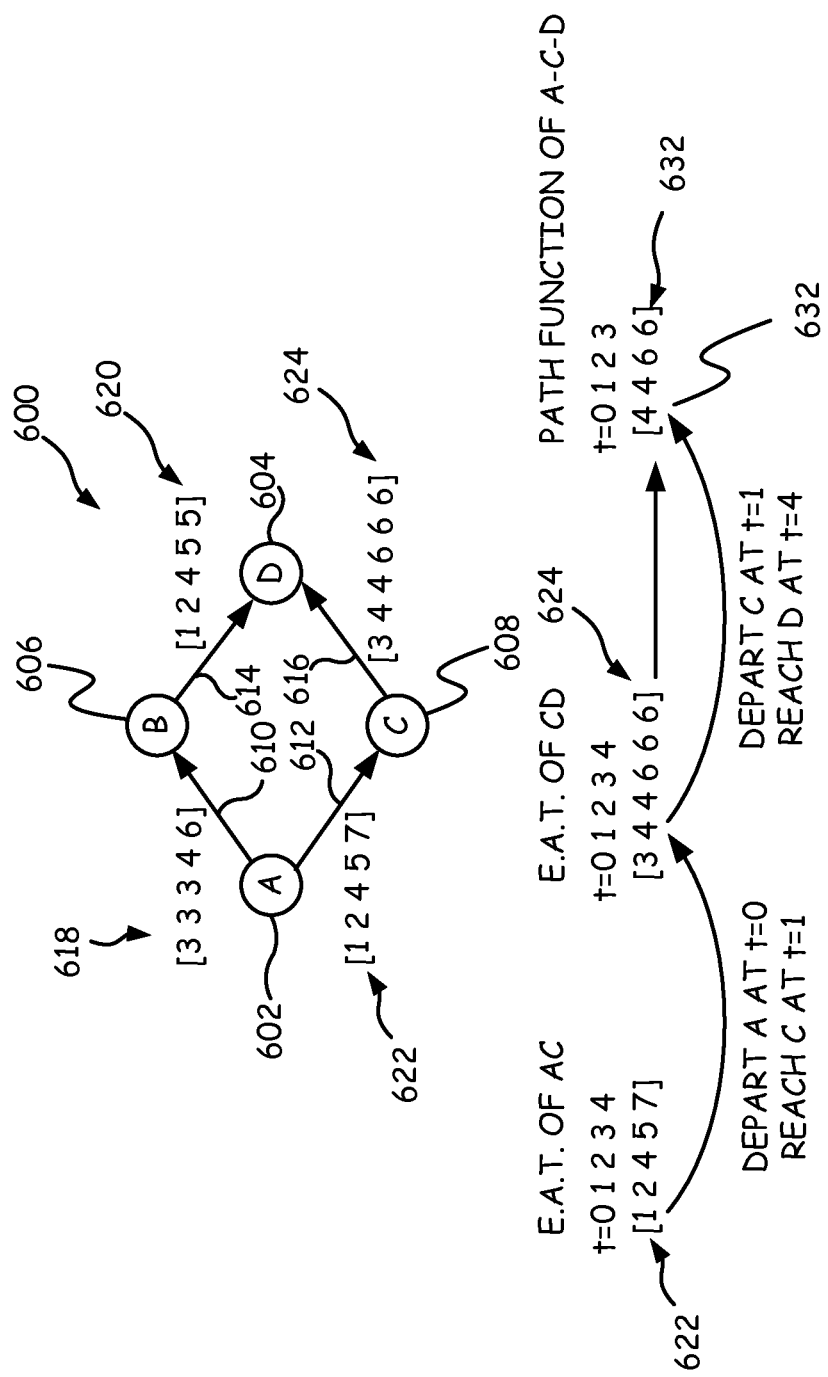
FIG. 6 shows a path function computation.

FIG. 6 provides a depiction of a method of computing a path function. In FIG. 6, a graph 600 shows an example network having nodes 602, 604, 606, and 608 that are connected by edges 610, 612, 614, and 616. Each of the edges or segments has an associated earliest arrival time series such as earliest arrival time series 618, 620, 622 and 624.

The path function represents the arrival time for arriving at an end node of a path given a start time at the source node. For example, to determine the path function for the path A-C-D, the earliest arrival time for path A-C is first used to identify the earliest arrival times at node C. These earliest arrival times are then applied to the earliest arrival times of path C-D to identify the path function for A-C-D. In FIG. 6, the earliest arrival time for path A-C for time t=0 is 1. Thus, the time point at which the traveler leaves node C is time t=1. As a result, the earliest arrival time for time t=1 on path C-D (4) is used to determine the arrival time at node D. This results in a path function value for start time t=0 over the whole path A-C-D of 4 as shown in path function series 630 by entry 632. This process is repeated for each start time at the source. Thus, the resulting path function represents the earliest arrival time at the end node in the path for each start time at the beginning of the path.

Returning to FIG. 5, after computing the path functions for each edge for all start times, critical times are identified and stored at step 510. To identify the critical times, each of the path functions for each edge leaving the current node are compared at each time point. The edge with the earliest path function for each starting time is identified. Each starting time at which the edge with the earliest path function changes is identified as a critical time. Identifying the critical times can also be described as determining transit times from the source to two separate locations for a plurality of start times and designating those start times at which the transit time to one of the two locations changes from being shorter than the transit time to the other of the two locations to being longer than the transit time to the other of the two locations. Still further, identifying the critical times can be described as determining path functions for each of the start times in a list of possible start times for two partial paths that each begin at the source. The start times at which the path function for one of the two partial paths becomes earlier than the path function for the other of the two partial paths are then identified as critical start times.

Figure 7:
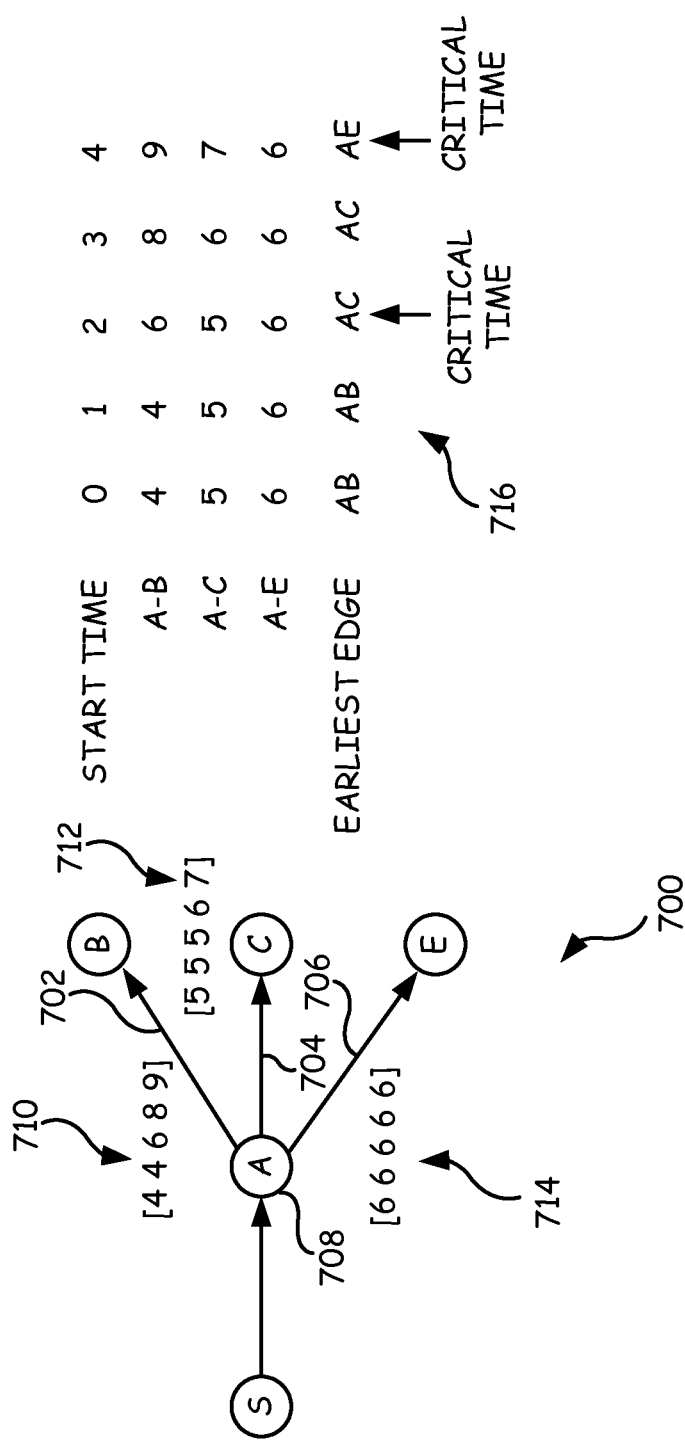
FIG. 7 shows concepts for critical time points.

FIG. 7 provides an example showing the depiction of critical times. In FIG. 7, a network 700 is shown with paths 702, 704, and 706 extending from node 708. Each of the paths has an associated path function 710, 712, and 714. As shown in table 716, for start times t=0 and t=1, the path functions indicate that edge AB will have the earliest path function of 4. At time t=2 however, edge AC has the earliest path function of 5, while edge AB has a path function of 6. Thus, at time t=2, the shortest path changes from AB to AC. Thus, time t=2 represents a critical time where the shortest path needs to be re-determined. At time t=3, edge AC and edge AE both have the same path function value of 6. In accordance with some embodiments, when two edges have the same path function, an edge that had the earliest path function at the previous time is considered to have the earliest path function at the current time. If more than one of the edges have the same path function and none of those edges had the earliest path function at the previous time, one of the edges is randomly selected as the edge with the earliest path function at the current time. At time t=4, edge AE provides the shortest earliest path function of 6 representing another transition in the shortest path. Thus, time t=4 also represents a critical time.

Each critical time that is identified is added to a critical times list 134. Thus, in the example of FIG. 7, start times t=2 and t=4 would both be added to critical times list 134 because they represent times when the shortest path will change. Note that some of the critical times are identified at step 510 before the shortest path for the current start time has been identified. Further, some of the critical times have been identified before determining a single complete path from the source to the destination. As shown in the example of FIG. 7, the critical times can be temporally separated from the current start time by at least one intermediate start time. For example, critical time t=2 is separated from current start time t=0 by intermediate start time t=1.

At step 512, paths from the source node through the current node to each of the edges extending from the current node are stored in the priority queue along with a path function value for the current start time. In the example of FIG. 7, paths S-A-B and a path function value of 4, path S-A-C and a path function value of 5, and path S-A-E and a path function value of 6 would be stored in the priority queue when the current start time is the initial start time t=0.

At step 514, the current node is removed from the priority queue by removing every path that ends at the current node from the priority queue. In addition, the current node is added to a closed node list 136 because the shortest path through the node for the given start time has been determined.

At step 516, shortest path identifier 116 determines if it has reached the destination node. If it has not reached the destination node, the process returns to step 504 where the earliest path function for the current start time is selected from the priority queue. Steps 506, 508, 510, 512, and 514 are then repeated for the newly selected path. Thus, steps 504, 506, 508, 510, 512 and 514 represent an iteration where during each iteration a path is selected for expansion at step 504 by selecting the path with the shortest transit time from the source at the current starting time.

When the destination has been reached at step 516, shortest path identifier 116 has identified a series of edges beginning from the source at the current start time and ending at the destination that together provide the shortest transit time from the source to the destination. This series of edges is a path from the source to the destination. At step 518, this path is stored for a range of start times. The range of start times extends from the current start time to the earliest critical time in critical time list 134 or if there are no critical times in list 134, to the last start time in the set of start times. By storing the path from the source node to the destination node for a range of start times, step 518 is setting the shortest path from the source to the destination for the current start time as the shortest path for the intermediate start times between the current start time and the earliest critical time without separately determining the shortest path for the intermediate start times. By not computing the shortest path for these intermediate start times, redundant calculations are eliminated and the identification of shortest paths at different start times is made more efficient.

At step 520, the list of critical times is examined to determine if there are more critical times in list 134. If there are more critical times, the earliest critical time in list 134 is set as the current start time and is removed from the critical time list. In addition, the priority queue and the closed node list are emptied. The process then returns to step 502 and steps 502-520 are repeated. Repeating the steps causes a new shortest path to be determined for the critical time that is different from the previous shortest path. Thus, steps 502-520 represent a second iteration, where the second iteration is performed for each start time in critical time list 134 but is not performed for the other start times in set of start times 130. Instead, start times that are in set of start times 130 but are not in critical time list 134 are set without performing the second iteration for those start times.

When there are no further critical times at step 520, the shortest paths and their associated start time ranges are returned at step 524 as shortest path and associated start times 122.

Figure 8:
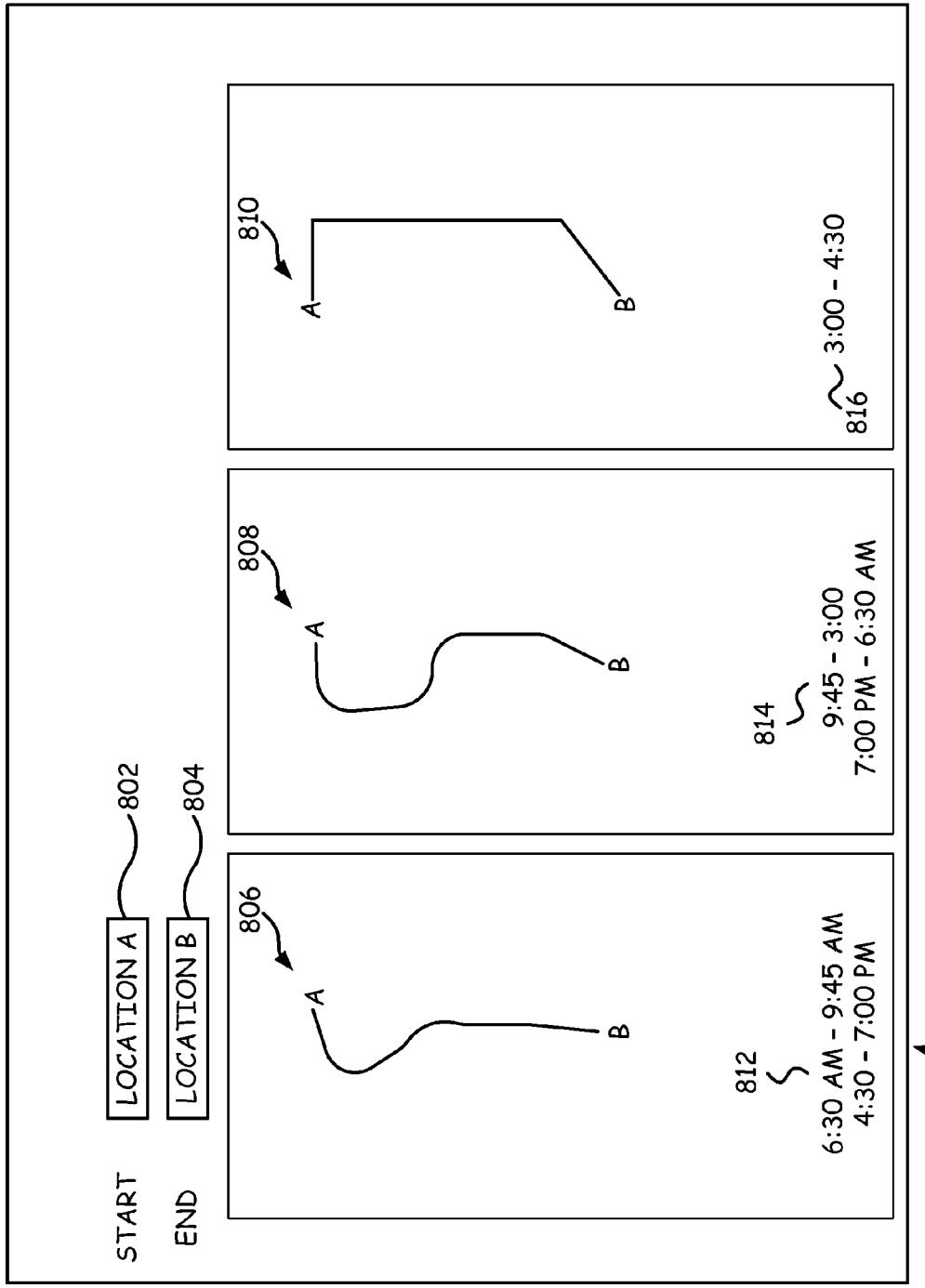
FIG. 8 is an example of a user interface.

FIG. 8 provides an example of a user interface 800 that may be returned to display 114 in step 208 of FIG. 2. In user interface 800, the starting location 802 and the ending location 804 are displayed to confirm the query provided by the user. In user interface 800, three routes 806, 808, and 810 are provided as shortest routes between start location 802 and end location 804. Each of the shortest routes 806, 808, and 810 has an associated starting time range or starting time ranges, which are displayed on user interface 800 as time ranges 812, 814, and 816. In the user interface 800, shortest routes 806 and 808 each have two time ranges associated with them. Note that although a single time range and two time ranges are shown for the routes of FIG. 8, any number of time ranges may be provided for each shortest route.

In user interface 800, the user is provided with a plurality of shortest routes so that they may pick the shortest route that is associated with the time at which they expect to start their trip. Thus, instead of being provided with a single shortest route, which may only be the shortest route if the user leaves immediately, the user interface of FIG. 8 provides the user with shortest routes that are more applicable to when the user will actually be traveling.

Figure 9:
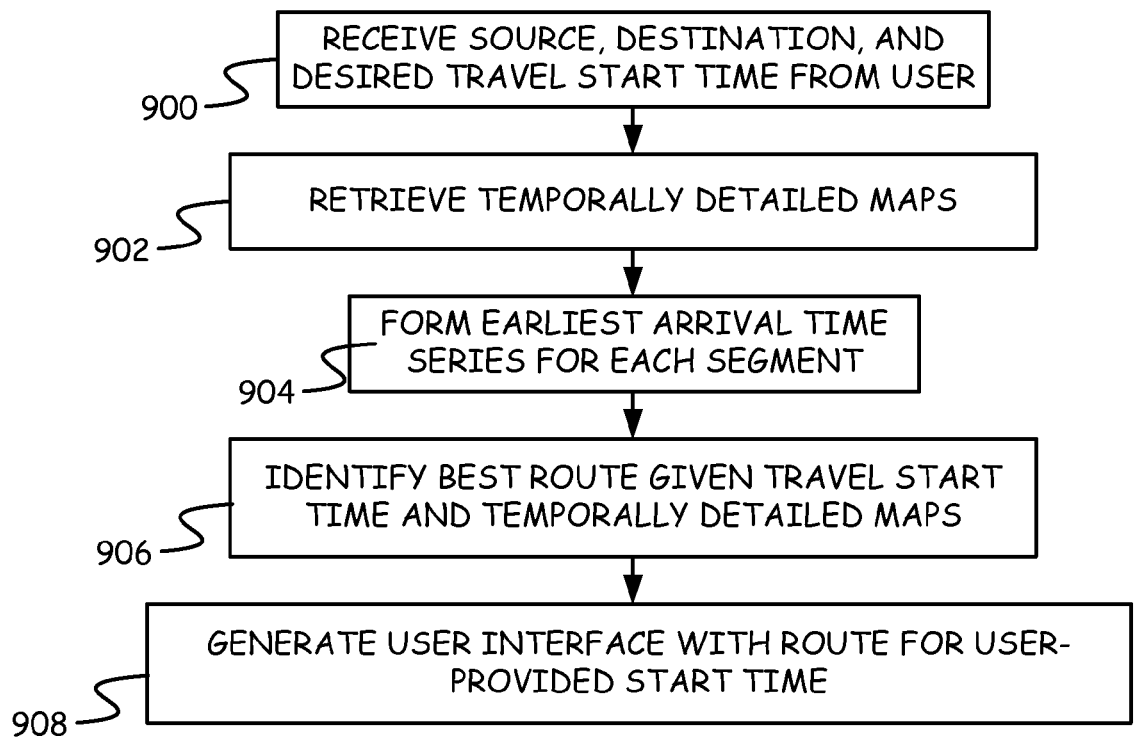
FIG. 9 is a flow diagram of an alternative embodiment for generating a user interface.

FIG. 9 provides a flow diagram of an alternative embodiment for generating a user interface with shortest route information. In FIG. 9, a source, a destination and a desired travel start time are received from the user. This information can be provided through a user interface on display 114 and provided to routing application 102 as source 104, destination 106 and start time 108.

At step 902, shortest path identifier 116 retrieves temporally detailed maps 118 and at step 904, determines the earliest arrival time series for each path segment or edge of interest in the temporally detailed maps given the source and destination.

At step 906, shortest path identifier 116 identifies the shortest route given the travel start time and the temporally detailed maps 118. During step 906, the method of FIG. 5 is utilized except for the steps involving critical times. In particular, step 510 of identifying and storing critical times is not performed, step 518 for storing a time range from a current time to a critical time is modified to storing a single path for the provided start time, and step 520 is not performed but instead the method goes directly from step 518 to step 524. However, all other steps of FIG. 5 are performed including the computations of the earliest arrival time series and the path functions. Thus, step 906 of FIG. 9 is able to take into consideration non-FIFO attributes of the path segments.

At step 908, a user interface 124 is generated with the shortest route for the user-provided start time.

Figure 11:
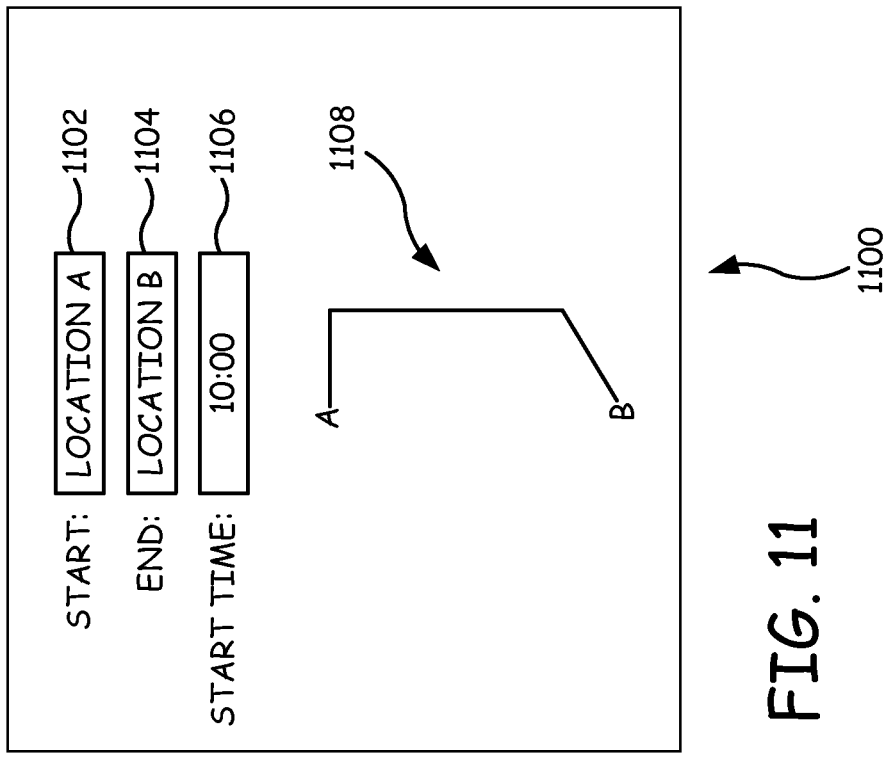
FIG. 11 shows examples of a user interface.
Figure 10:
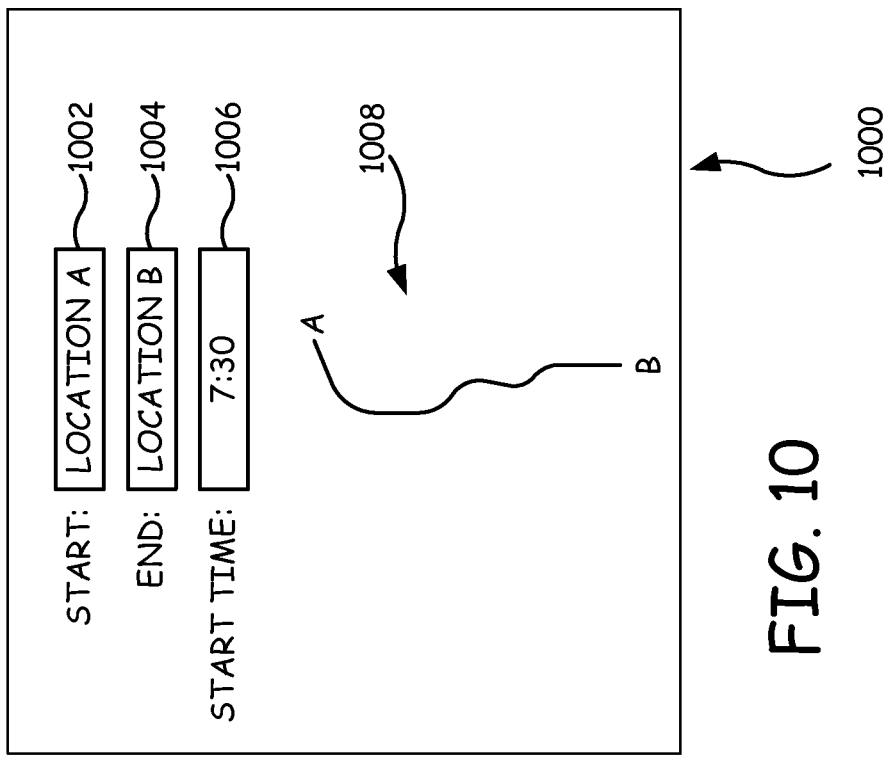
FIG. 10 shows examples of a user interface.

FIGS. 10 and 11 provide examples of a user interface 1000 and 1100 that depict a returned shortest route for two different user-provided start times. In FIG. 10, the starting location 1002, the ending location 1004 and the start time 1006 provided by the user are returned in the user interface to confirm the user query. In addition, a shortest route 1008 is depicted for the user. In other embodiments, a textual description of the shortest route 1008 may also be provided or may be provided in the alternative. Similarly, in FIG. 11, the starting location 1102, the ending location 1104 and the starting time 1106 provided by the user are displayed in the user interface 1100 to confirm the user's query and a shortest route 1108 is depicted in the user interface for the start time 1106. In user interface 1100, a textual description of route 1108 may be provided in addition to or as alternative to the displayed shortest route.

Figure 12:
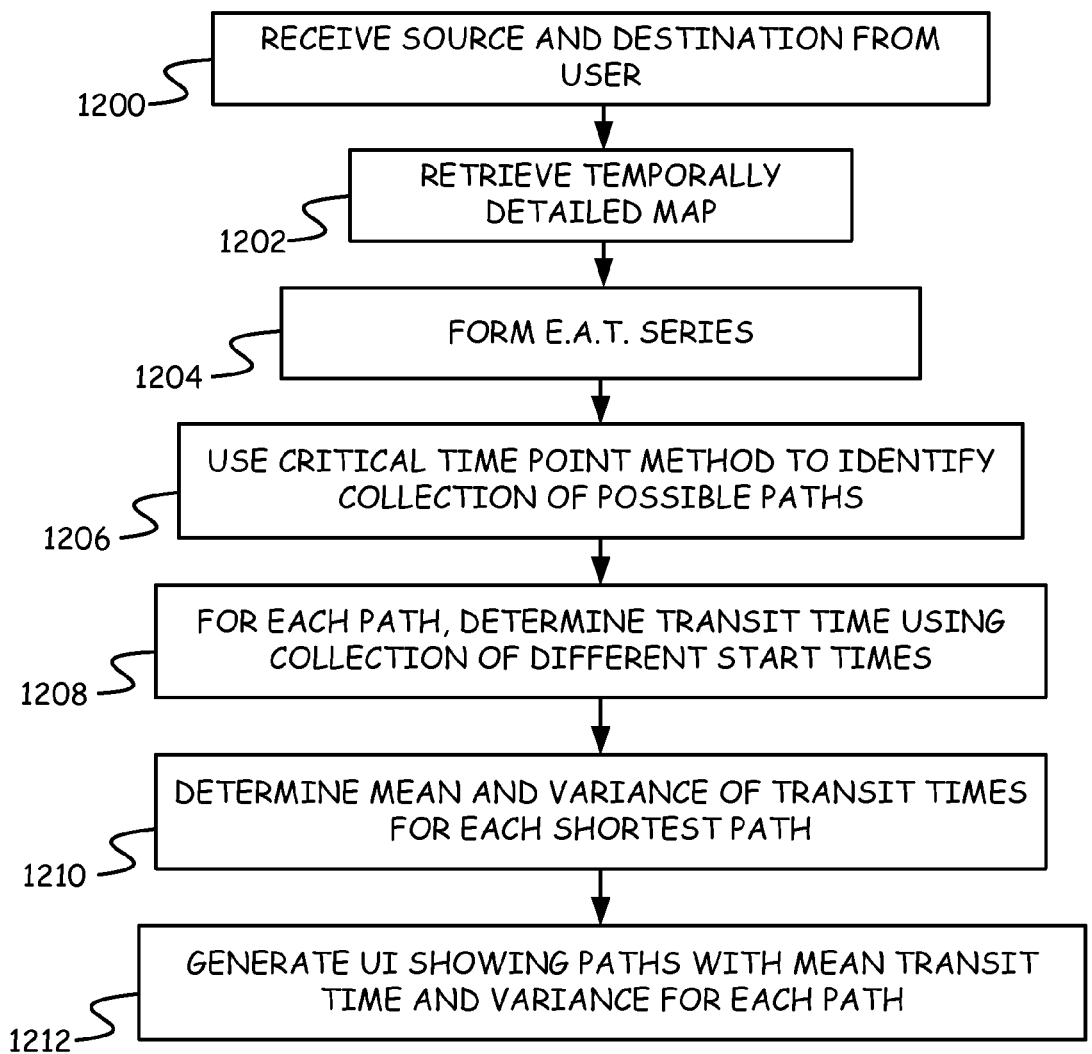
FIG. 12 is a flow diagram of a further embodiment for displaying route information.

FIG. 12 provides a flow diagram of a further embodiment for displaying route information.

In step 1200, shortest path identifier 116 receives a source 104 and a destination 106 provided by a user through client device 112. At step 1202, the temporally detailed map 118 is retrieved and at step 1204, the earliest arrival time series for each path segment is formed.

At step 1206, the method of FIG. 5 is used to identify a collection of possible shortest paths. At step 1208, the path functions for each of the shortest paths are determined thereby providing an earliest arrival time for each start time in a range of start times. At step 1210, the path functions 160 of the shortest paths are provided to a mean and variance calculator 162, which determines a mean transit time 164 and a variance in the transit times 166 based on the path functions. In accordance with one embodiment, a separate mean and a separate variance is determined for each shortest path. The mean transit time for a shortest path is computed in one embodiment by summing the transit times in the path functions of the shortest path and dividing by the number of starting times in the path functions. The variance is computed in some embodiments by using the difference between the transit times of the path functions and the mean transit time in a standard variance calculation.

At step 1212, a user interface 124 is generated showing the shortest paths and their associated mean transit time and variance.

Figure 13:
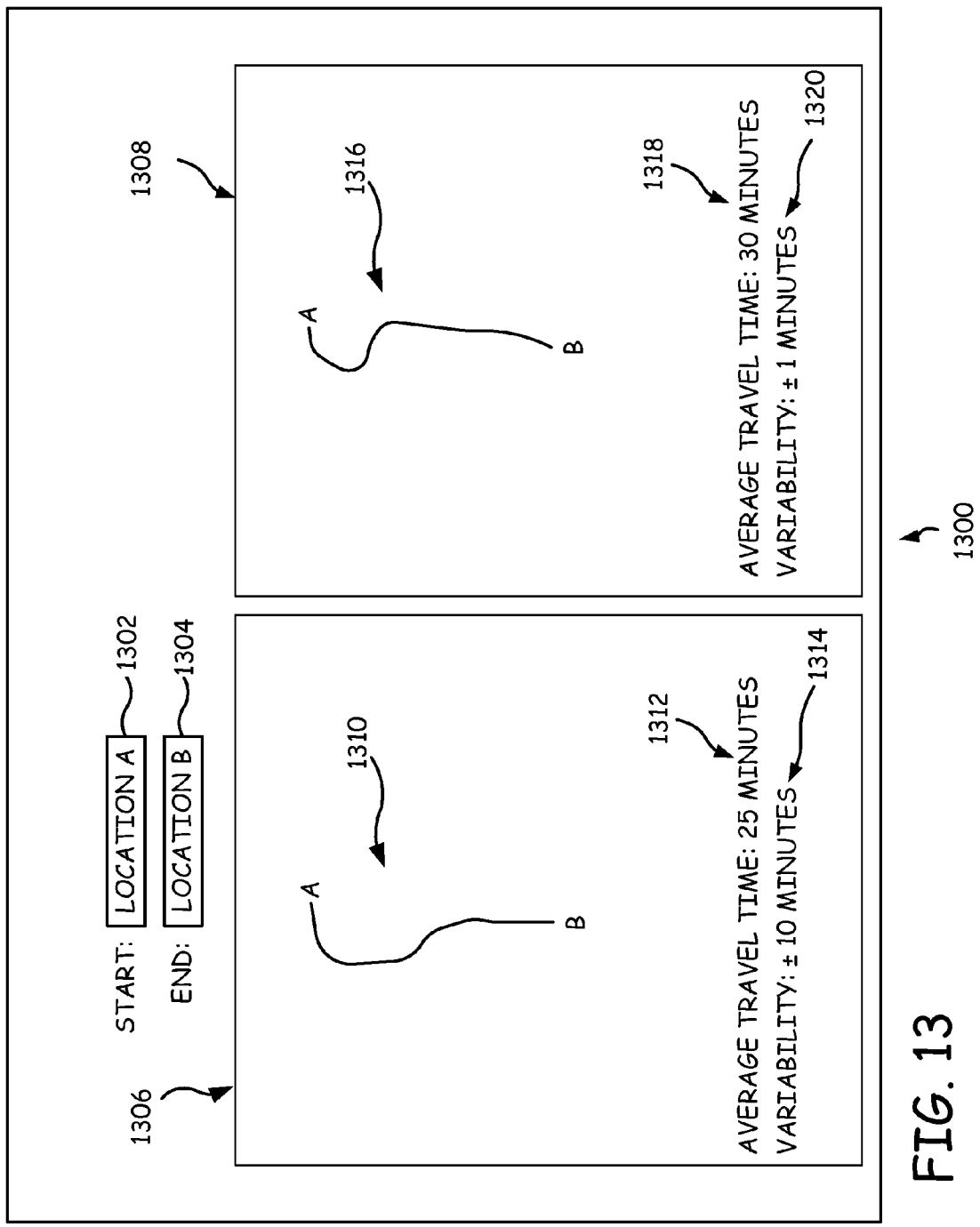
FIG. 13 is an example of a user interface depicting shortest routes.

FIG. 13 provides an example of a user interface 1300 depicting shortest routes with their associated means and variances. In user interface 1300, the starting location 1302 and the ending location 1304 for the routes are provided to the user to confirm the user query. In user interface 1300, two shortest routes 1306 and 1308 are depicted. Shortest route 1306 includes a displayed path 1310 and an average or mean travel time 1312 and a variance or variability in the travel time 1314. Shortest route 1308 includes a diagram 1316 of the route, a mean travel time 1318 and variability in the travel time 1320. As depicted in FIG. 13, a route may have a longer average travel time but may have less variability. By providing this additional information about the variability of each path, users are given more options when selecting a shortest path for travel between their source and destination.

Experiments were conducted to evaluate the performance of the method of FIG. 5 as different parameters were varied. The experiments were carried out on a real dataset containing the highway road network of Hennepin County, Minn. The dataset contained 1417 nodes and 3754 edges. The data set also contained travel times for each edge at time quanta of 15 minutes. The experiments were conducted on an Intel Quad core Linux workstation with 2.83 GHz CPU and 4 GB RAM. The performance of the method was compared against a modified version of the existing BEST (MBEST) start time algorithm.

The MBEST algorithm consists of two main parts. First, the shortest path between source and destination is determined for all the desired start time instants. Second, the computed shortest paths are post-processed and a set of distinct paths is returned. The MBEST algorithm uses a label correcting approach similar to that of BEST algorithm to compute the shortest paths between source and destination. The algorithm associates two lists, an arrival time list and an ancestor list, with each node. The arrival time array, $C_v[t]$, represents the earliest arrival time at node v for the start time t at the source. The ancestor array, $An_v[t]$, represents the previous node in the path from source for time t. These lists are updated using Equation 2 below, where $\gamma_{uv}[t]$ represents the earliest arrival time series of the edge (u,v). The algorithm terminates when there are no more changes in the arrival time list of any node.

$$C_v[t] = \min\{C_v[t], \gamma_{uv}[C_u[t]]\}, uv \in E \quad (2)$$

A set of different queries (each with different parameters) was run using the method of FIG. 5 and the MBEST algorithms. The following parameters were varied in the experiments: (a) length of the time interval over which shortest paths were desired ($|\lambda|$), (b) total travel time of the route, (c) time of day (rush hour vs non-rush hours). A speedup ratio, given by Equation 3, was computed for each run. The total number of re-computations avoided by the method of FIG. 5 was also recorded for each run. In the worst case, the shortest paths may have to be re-computed for each time instant in the interval $\lambda$. The total number of re-computations saved is the difference between $|\lambda|$ and re-computations performed.

FIG. 14 shows graphs of the number of re-computations saved by the method of FIG. 5. In FIG. 14, graphs 1400, 1404, 1408, and 1412 show the results when using one hundred start times and graphs 1402, 1406, 1410 and 1414 show the results when using two hundred start times. In graphs 1400, 1402, 1408, and 1410, the travel time along the path with no traffic is 30 minutes. In graphs 1404, 1406, 1412 and 1414, the travel time along the path with no traffic is 40 minutes. In graphs 1400, 1402, 1404, and 1406, the time range for the starting times spans a non-rush hour period and in graphs 1408, 1410, 1412 and 1414, the time range spans a rush hour. The experiments showed that more savings were gained where the number of starting times was greater (lambda=200 versus lambda=100). Similarly, fewer recomputations were performed in the case of non-rush hour start times. This is because there were fewer intersections among the path-functions and thus fewer critical time points.

FIG. 15(a) shows a speed-up ratio for Non-rush hour and FIG. 15(b) shows the speed-up ratio for Rush hour as a function of the number of starting times. The speed-up ratio is calculated as the run time needed by the MBEST algorithm over the run time of the method of FIG. 5. The speed-up ratio was calculated for paths with travel time=30 and travel time=40. These travel times indicate the time required to travel on these paths during non-rush hour when there is no traffic.

Figure 16A:
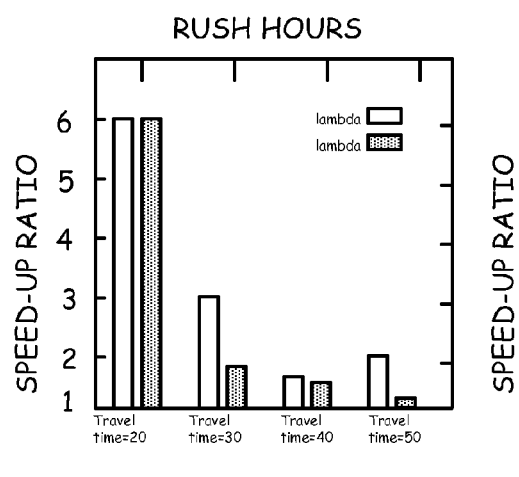
FIGS. 16a and 16b are graphs of the effect of travel time on speed-up for non-rush hour and rush hour start times.
Figure 16B:
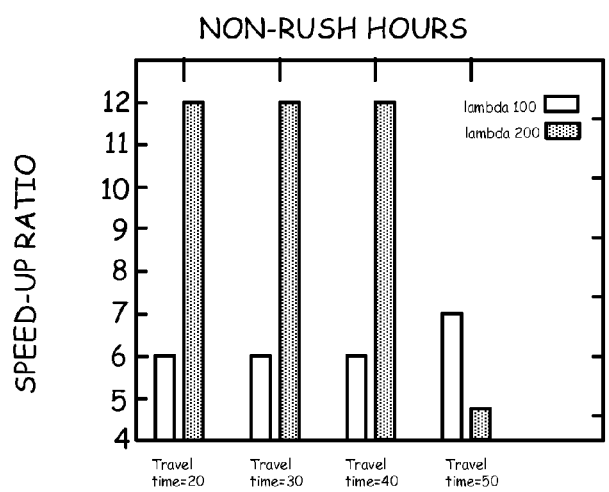

An experiment was also performed to evaluate the effect of total travel time of a path on the candidate algorithms. FIGS. 16(a) and 16(b) show the speed-up ratio as the total travel time of the path was varied. The experiments showed that with increasing travel time, the speed-up ratio decreased for rush hour and roughly stayed the same for non-rush hours. The experiments also showed that better speed-up was obtained for non-rush hours than for rush hour.

Figure 17:
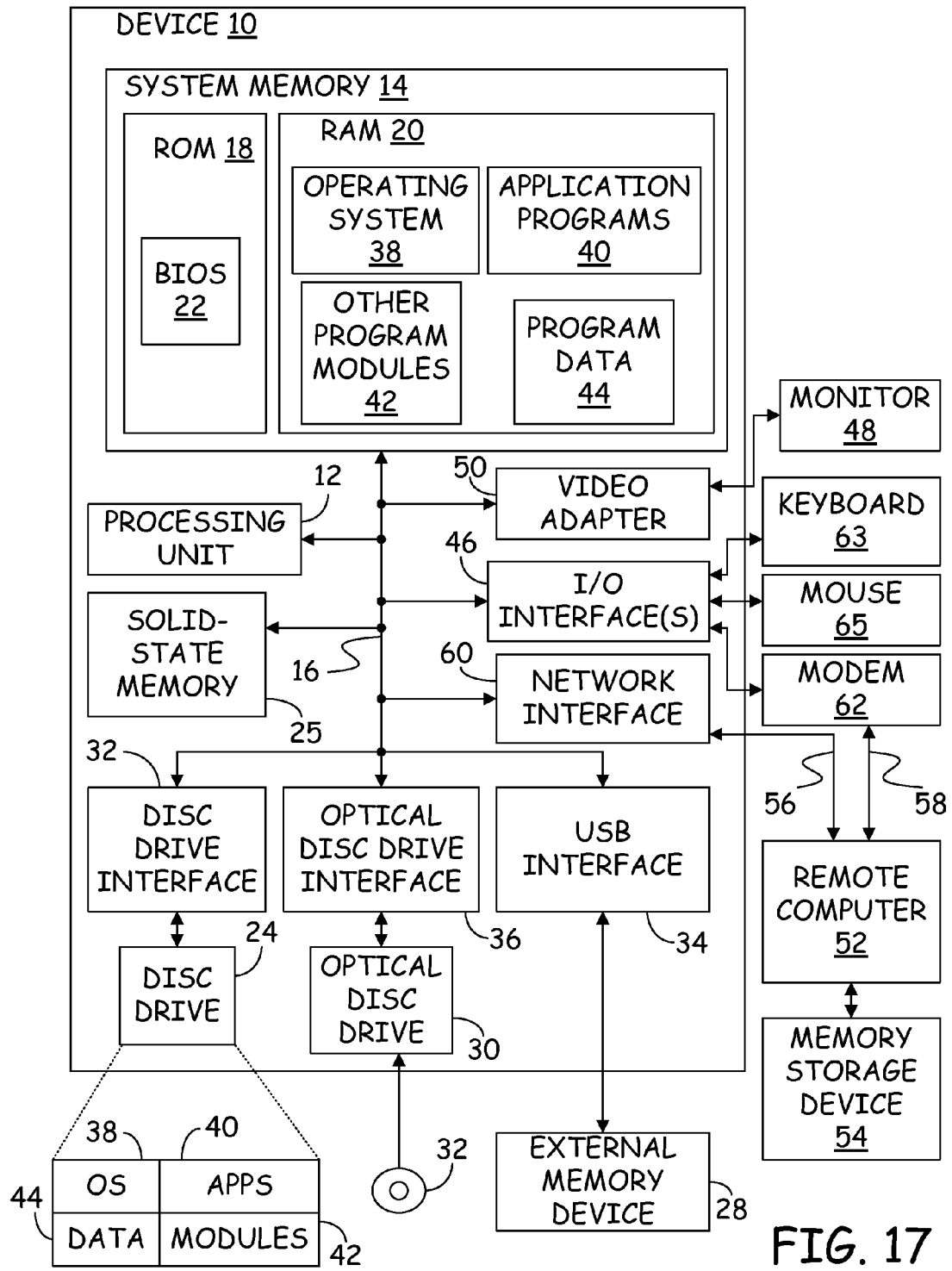
FIG. 17 is a block diagram of a computing device that may be used in accordance with the various embodiments.

An example of a computing device that can be used as a server and/or client device in the various embodiments is shown in the block diagram of FIG. 17. The computing device 10 of FIG. 17 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for executing the methods described above including routing application 102 and web application 110. Program data 44 may include source 104, destination 106, start time 108, temporally detailed map 118, priority queue 132, closed nodes 136, E.A.T. path functions 120, critical times 134, set of start times 130, shortest paths and associated start times 122, path functions of shortest paths 160, means 164, variances 166 and user interfaces 124.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 17. The network connections depicted in FIG. 17 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 17 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining a set of start times;
   determining a shortest path from a source to a destination for a current start time in the set of start times;
   a processor identifying a critical start time in the set of start times temporally separated from the current start time by at least one intermediate start time in the set of start times wherein identifying a critical start time comprises:
      identifying a shortest path from the source to a current node;
      identifying at least two edges that extend from the current node;
      for each edge that extends from the current node, determining path functions that indicate an earliest arrival time for traveling from the source to an end of the edge opposite the current node for each start time in the set of start times after the current start time;
      comparing each of the path functions for each edge at each start time after the current start time; and
      identifying each start time at which the edge with the earliest path function changes as a critical start time;
   setting the shortest path from the source to the destination for the current start time as the shortest path for the at least one intermediate start time without separately determining the shortest path for the at least one intermediate start time;
   determining a different shortest path from the source to the destination for the critical start time than for the current start time; and
   generating a user interface displaying a plurality of shortest paths from the source to the destination.

2. The method of claim 1 wherein identifying a critical start time comprises identifying the critical start time while determining the shortest path from the source to the destination for the current start time.

3. The method of claim 2 wherein determining a shortest path for the current start time comprises:
   retrieving a temporally detailed map providing nodes that include the source and the destination, edges between nodes, and transit times for travelling across each edge at different times; and
   beginning from the source at the current start time, identifying a series of edges between the source and the destination that together provide the shortest transit time from the source to the destination.

4. The method of claim 1 wherein generating the user interface comprises displaying each shortest path with a variance of transit times along the path.

5. The method of claim 1 wherein generating a user interface displaying a plurality of shortest paths from the source to the destination comprises displaying each shortest path with at least one start time at which the path is the shortest path from the source to the destination.

6. The method of 1 further comprising:
   determining a transit time along the shortest path determined for the current start time at each of the start times in the set of start times;
   determining the mean of the transit times;
   determining the variance of the transit times; and
   generating a user interface indicating the variance in the transit times along the shortest path.

7. A computer-readable storage medium having instructions stored thereon that when executed by a processor cause the processor to perform steps comprising:
   identifying start times for which a shortest path should be separately determined through steps comprising:
      determining transit times from a source to two separate locations for a plurality of different start times; and
      designating each start time at which the transit time to one of the two locations changes from being shorter than the transit time to the other of the two locations to being longer than the transit time to the other of the two locations as a critical start time for which a shortest path should be separately determined;
   separately determining the shortest path from a source to a destination for all of the critical start times but fewer than all of a plurality of possible start times;
   for each start time that a shortest path is not separately determined, assigning a shortest path from the source to the destination that was separately determined for a start time that precedes the start time; and
   generating a user interface displaying a plurality of shortest paths from the source to the destination.

8. The computer-readable storage medium of claim 7 wherein determining a shortest path comprises iteratively expanding paths wherein during each iteration, a path with a shortest transit time from the source is selected for expansion.

9. The computer-readable storage medium of claim 7 further comprising identifying a start time for which a shortest path should be separately determined when determining a shortest path from the source to the destination for another start time.

10. The computer-readable storage medium of claim 7 further comprising determining a variance in a transit time of each shortest path and wherein generating a user interface comprising providing the variance of each shortest path.

11. The computer-readable storage medium of claim 7 wherein assigning a shortest path from the source to the destination that was separately determined for a start time that precedes the start time comprises assigning the shortest path to a range of start times.

12. The computer-readable storage medium of claim 11 wherein generating a user interface further comprises providing at least one range of start times for each shortest path.

13. The computer-readable storage medium of claim 12 wherein generating the user interface further comprises providing at least two ranges of start times for one of the shortest paths.

14. A routing system comprising:
   a memory containing a list of possible start times for traveling from a source to a destination across a network of edges;
   a processor selecting an earliest start time from the list of possible start times and determining path functions for paths in the network to identify a shortest path from the source to the destination for the earliest start time;
   the processor using the path functions to generate a second list of start times, the second list of start times limited to start times when the shortest path will change;
   the processor performing an iteration to identify a shortest path from the source to the destination for each start time in the second list of start times;
   the processor setting the shortest path for start times in the list of possible start times that are not in the second list of start times without performing the iteration; and
   generating a user interface that displays two different shortest paths for two different starting times.

15. The routing system of claim 14 wherein generating the user interface further comprises including ranges of starting times for each shortest path.

16. The routing system of claim 14 further comprising determining a measure of variations in the transit time of a shortest path associated with different start times and generating a user interface that displays the measure.

17. The routing system of claim 14 wherein using the path functions to identify start times when the shortest path will change comprises:
   determining path functions for each of the start times in the list of possible start times for two partial paths that each begin at the source; and
   identifying a start time as a start time when the shortest path will change by identifying a start time at which the path function for one of the two partial paths becomes earlier than the path function for the other of the two partial paths.

* * * * *